Nov. 21, 1933.  A. LEIB  1,935,883

RADIO COMPASS

Filed Nov. 5, 1929

INVENTOR
AUGUST LEIB
BY
ATTORNEY

Patented Nov. 21, 1933

1,935,883

UNITED STATES PATENT OFFICE 1,935,883

RADIO COMPASS

August Leib, Berlin, Germany, assignor to Telefunken Gesellschaft fur Drahtlose Telegraphie, Berlin, Germany Application November 5, 1929, Serial No. 404,979, and in Germany January 16, 1929

3 Claims. (Cl. 250—11)

It has been suggested, in taking bearings, to place above the bearing disc which is fixed relative to the ship's magnetic compass card coaxially to the bearing disc. The position of the bearing disc (for instance of its zero-line which coincides with the axis of the ship) in relation to the compass card would then indicate the angle between the course of the ship and the magnetic meridian, whereas the bearing indicating hand attached directly to the radio compass bearing wheel or guided by the latter would indicate on the bearing disc the angle between the incoming radio beam and the axis of the ship, and on the compass card the angle between the incoming radio beam and the magnetic meridian.

The simultaneous observation of the swing of the bearing hand with respect to the fixed bearing disc and the movable compass card is often attended with certain difficulties especially apparent when the ship is executing various turning and swaying movements caused by the rolling of the ship or by the changing position of the steering rudder. Due care must therefore be exercised to take the radio compass reading at the very moment that a sharp bearing angle has been established, for instance, by adjusting the direction finder aerial to a distinct minimum.

The present invention provides means which diminishes the possibility of taking readings at a later time. This is attained in accordance with the present invention by making the compass card which is coaxial with the bearing disc and driven in synchronism with the ship's magnetic compass, detachable from its drive and arrestable.

Figure 1:
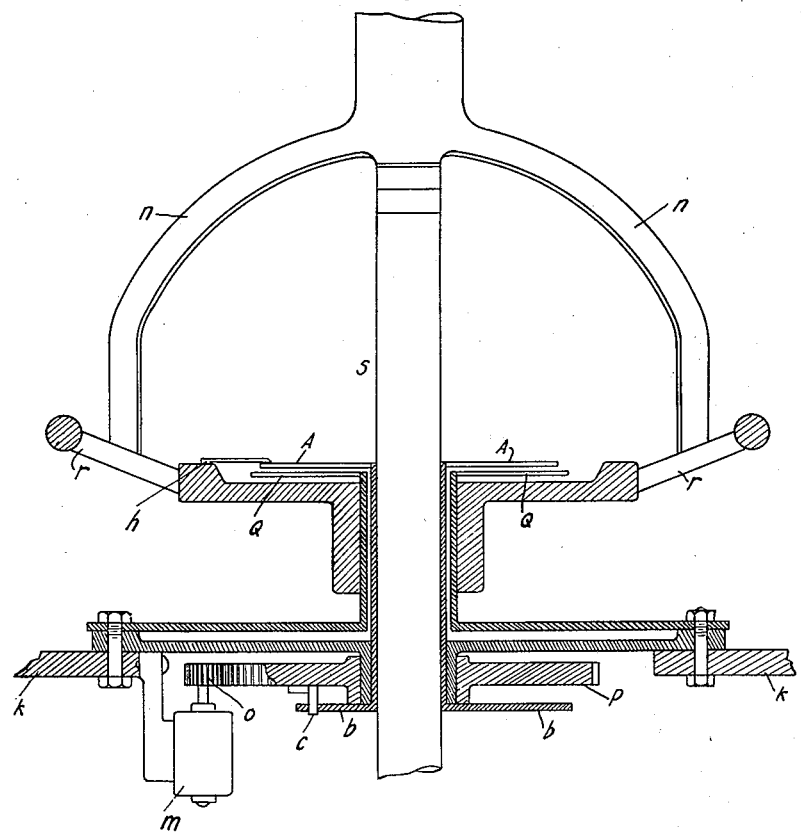
Figure 2:
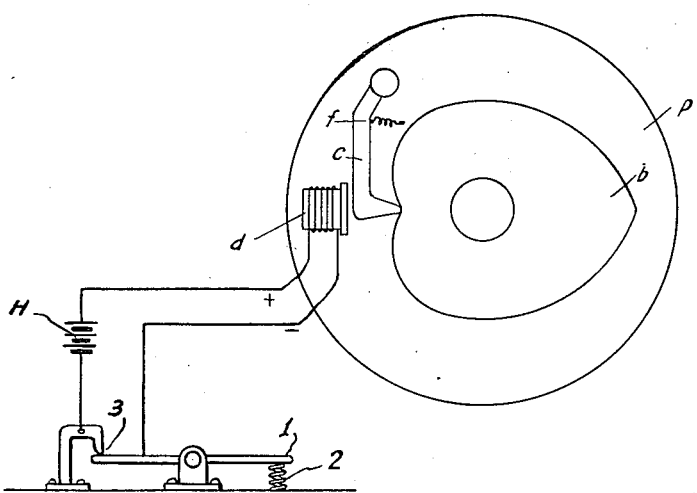

An example of such an arrangement in accordance with the invention is illustrated on the drawing, Figure 1 shows in elevation an embodiment of the invention while;

Figure 2 shows a modification of the apparatus of Figure 1.

Referring to the drawing and especially to Figure 1, Q denotes the bearing disc rigidly connected by bolts as shown to the ship's body K. A is the compass card built in the form of a repeater compass driven by a master compass in a manner which will appear more in detail hereinafter. A is arranged coaxially to the bearing disc Q. The compass card A is automatically made to assume a position corresponding to that of the main compass by a driving device consisting, for instance, of a motor $m$ operated in any manner to drive the card A in synchronism with the main magnetic compass by way of the gears $o$ and $p$. A bearing hand or indicator $h$ is connected to the radio compass absorption member hand wheel and moves therewith over the dials A and Q. This indicator $h$ may be directly attached to the bearing wheel, as shown in this figure for the sake of simplicity, in which case it indicates the apparent bearing angle, for which positive or negative corrections must be made on account of the board deflections of the radio beam, these corrections being obtained from experimental tables. It is, however, preferable to arrange the hand $h$ in such a manner that it will be guided by the bearing wheel $r$ along a curve adapted to take care of the desired corrections so that, when adjusting the bearing wheel $r$ in a bearing position, for instance in a receiving minimum, the true bearing angle will appear. The bearing wheel $r$ is rigidly connected to the shaft $s$ of the direction finder aerial by means of the bail $n$.

Normally the repeater compass A is coupled to the gear $p$ of the relay mechanism for rotation therewith by means of a suitable coupling arrangement comprising a disc $b$ with a depression in its periphery and a stop member $c$. The moment, however, that the bearing wheel or direction finder aerial reaches the bearing position, for instance at a sharp reception minimum, the observer can, by a movement of his foot, disconnect the repeater compass card A from the gear $p$ either mechanically or electrically, by disengaging parts $c$ and $b$. The repeater compass A remains now fixed in its position, either due to friction between the cylindrical shaft of A and the loop shaft or by engaging certain fastening devices not shown on the drawing. In this manner it is possible to take readings of the desired angles conveniently and without haste.

The connecting or disconnecting mechanism of the repeater compass A may be of any suitable design.

One arrangement of such a mechanism is pictured in Figure 2. Part $b$ of the repeater compass is heart-shaped, similar to the disengageable coupling of stop watches. The gear $p$ carries an anchor $c$ which normally, provided the electromagnet $d$ is not energized, forces the disc $b$, due to the action of spring $f$, to assume a certain fixed position relative to wheel $p$ and to maintain this position during the turning of wheel $p$. To release the anchor $c$ it is necessary to energize the electromagnet $d$. One manner in which this may be accomplished is shown in Figure 2. At the opportune instant the contact member 1, normally biased to open position by spring 2, may be manipulated by the observer's foot, or otherwise, to close a circuit through battery H and magnet d via contact 3. The circuit through H and d may be completed in any manner as, for instance, via rings on S cooperating with brushes. This permits rotation of S without injury to the leads between the magnet and the contact member 1.

I claim:

1. Means for operating a radio compass to obtain instant readings comprising, a rotatable support for a radio energy absorption member, a direction indicating member on said support, a compass card rotatably mounted adjacent the indicating member on said support, means to maintain said compass card in a predetermined angular position with reference to magnetic north comprising, a disc member fastened to said compass card, driving means, a connection between said disc member and said driving means, and means for stopping movement of said compass card in any position comprising means for interrupting the drive between said disc member and said driving means whereby the angular position of said rotatable support with reference to magnetic north may be determined correctly at any instant.

2. Means for operating a radio compass to obtain instant readings comprising, a rotatable support for a radio energy absorption member, a direction indicating member on said support, a compass card rotatably mounted coaxially with respect to said support adjacent said indicating member, means to maintain said compass card in a predetermined angular position with reference to magnetic north comprising, a driving motor, a disc member fastened to said compass card, a gear driven by said motor, a drive which is capable of disengagement interposed between said gear and said disc member, and means for stopping movement of said compass card in any position comprising means for interrupting the drive between said gear member and said disc whereby the angular position of said rotatable support with reference to magnetic north may be determined correctly at any instant.

3. An arrangement as claimed in claim 2 in which said drive between said gear and disc comprises a recess in the periphery of said disc and a stop member fastened to said gear and normally biased to enter said recess, and in which said interrupting means comprises a magnet having an armature which when energized removes said stop member from the recess in the periphery of said disc.

AUGUST LEIB.